(12) United States Patent
Davis

(10) Patent No.: US 7,461,476 B1
(45) Date of Patent: Dec. 9, 2008

(54) FISHING POLE FOR UNDERWATER USE

(76) Inventor: Edward H. Davis, N. 4873 Morken Rd., Melrose, WI (US) 54642

( * ) Notice: Subject to any disclaimer, the term of this patent is extended or adjusted under 35 U.S.C. 154(b) by 0 days.

(21) Appl. No.: 11/598,267

(22) Filed: Nov. 13, 2006

Related U.S. Application Data

(60) Provisional application No. 60/834,526, filed on Jul. 31, 2006.

(51) Int. Cl.
 A01K 87/00 (2006.01)
(52) U.S. Cl. .............................. 43/18.1 R; 43/18.1 CT; 43/18.1 HR
(58) Field of Classification Search ................ 43/18.1, 43/18.1 HR, 18.1 CT
 See application file for complete search history.

(56) References Cited

U.S. PATENT DOCUMENTS

| | | | |
|---|---|---|---|
| 1,276,780 A | 8/1918 | Lucas | |
| 1,285,679 A | 11/1918 | Glowacki | |
| 1,595,275 A | 8/1926 | White | |
| 1,613,522 A | 1/1927 | Mathey | |
| 1,618,302 A | 2/1927 | Mathey | |
| 2,334,648 A | 11/1943 | Price | |
| 2,578,663 A | 12/1951 | Beaupre | |
| 2,777,239 A | 1/1957 | Cushman | |
| 2,874,507 A * | 2/1959 | Faber et al. | 43/18.1 CT |
| 2,977,706 A * | 4/1961 | Merz | 43/19 |
| 3,121,290 A * | 2/1964 | Brown | 43/18.1 CT |
| 3,184,878 A * | 5/1965 | Senne | 43/4 |
| 3,269,049 A * | 8/1966 | Emmons | 43/23 |
| 3,417,500 A * | 12/1968 | Carabasse | 43/18.1 HR |
| 3,419,991 A * | 1/1969 | Mitchell | 43/19 |
| 3,432,958 A | 3/1969 | Bellinger | |
| 3,447,254 A * | 6/1969 | Sobel et al. | 43/18.1 HR |
| 3,500,570 A * | 3/1970 | Hubbard | 43/18.1 R |
| 3,618,253 A * | 11/1971 | Edwards et al. | 43/26 |
| 3,727,338 A | 4/1973 | Pedersen | |
| 3,798,823 A * | 3/1974 | Watters et al. | 43/23 |
| 3,828,459 A * | 8/1974 | Easom | 43/19 |
| 3,924,346 A * | 12/1975 | Evers | 43/26.2 |
| 4,027,419 A * | 6/1977 | Popeil | 43/18.1 CT |
| 4,121,369 A | 10/1978 | Lopez | |
| 4,151,672 A | 5/1979 | Lopez | |
| 4,216,602 A * | 8/1980 | Daniels | 43/18.1 R |
| 4,223,466 A | 9/1980 | King | |
| 4,237,639 A * | 12/1980 | Uemori et al. | 43/18.1 CT |
| 4,654,994 A * | 4/1987 | Roberts, Jr. | 43/19 |
| 5,165,358 A * | 11/1992 | Fielder | 114/255 |
| 5,241,773 A | 9/1993 | Burgh | |
| 5,316,264 A | 5/1994 | Newman, Sr. et al. | |

(Continued)

Primary Examiner—Kurt Rowan
(74) Attorney, Agent, or Firm—Tipton L. Randall

(57) ABSTRACT

A fishing pole and line assembly for underwater use includes a linear, tubular fishing rod member having first and second open ends. A linear, tubular handle member has an open first end and a closed second end and is axially aligned with the rod member. The handle member's open first end slidably fits over the second end of the fishing rod member. The handle member includes a one-way valve member adapted for passing fluid only into the tubular handle member. A fishing line is secured at a first end interior the tubular handle member, with the fishing line passing interior both the handle member, the fishing rod member and extending through the rod member's open first end. The fishing line has a second end adapted for attachment to a fishing bait.

17 Claims, 10 Drawing Sheets

U.S. PATENT DOCUMENTS

| | | |
|---|---|---|
| 5,381,619 A | 1/1995 | Watkins |
| 6,908,249 B2 | 6/2005 | Tomm |
| 7,226,365 B2 * | 6/2007 | Qualizza .................... 473/318 |

* cited by examiner

FISHING POLE FOR UNDERWATER USE

CROSS-REFERENCE TO RELATED APPLICATIONS, IF ANY

This application claims the benefit under 35 U.S.C. §119 (e) of co-pending provisional application Ser. No. 60/834,562, filed 11 Sep., 2006. Application Ser. No. 60/834,562 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to fishing poles and, more particularly, to fishing poles suitable for underwater use.

2. Background Information

Fishing is a popular recreational activity in which millions of individuals participate. There are many choices of equipment used by fisherman to catch fish. Fishing equipment can range from a simple hand line to a long pole with a fishing line fastened at one end or to expensive rod and reel combinations, the most commonly used fishing equipment. These fishing poles are all designed for use by an individual positioned above the body of water in which the fish are located.

In more recent times, individuals are able to descend into the water to view the aquatic environment using snorkeling or scuba equipment. The divers are able to determine the location of fish that can only be guessed at from above the water's surface. It would be advantageous for the divers to be able to fish from underwater, because they can observe the fish and present bait directly to the fish. However, the underwater environment presents many difficulties when attempting to use standard fishing equipment underwater for catching fish.

Some examples of fishing poles for which patents have been granted include the following. U.S. Pat. No. 1,276,780 by Lucas; U.S. Pat. No. 1,285,679 by Glowacki; U.S. Pat. No. 1,595,275 by White; U.S. Pat. No. 1,613,522 by Mathey; U.S. Pat. No. 1,618,302 by Mathey; U.S. Pat. No. 2,334,648 by Price; U.S. Pat. No. 2,578,663 by Beaupre; U.S. Pat. No. 2,777,239 by Cushman; U.S. Pat. No. 3,417,500 by Carabasse; U.S. Pat. No. 3,432,958 by Bellinger; U.S. Pat. No. 3,447,254 by Sobel et al.; U.S. Pat. No. 3,727,338 by Pedersen; U.S. Pat. No. 4,121,369 by Lopez; U.S. Pat. No. 4,151,672 by Lopez; U.S. Pat. No. 4,223,466 by King; U.S. Pat. No. 4,654,994 by Roberts, Jr.; U.S. Pat. No. 5,241,773 by Burgh; U.S. Pat. No. 5,316,264 by Newman, Sr., et al., and U.S. Pat. No. 5,381,619 by Watkins.

The fishing poles described in the above patents are designed for use above water. A fishing pole for underwater use requires specific features and functions not available in the fishing poles described in the above patents. These features include the ability to hook a fish without a sweeping motion imparted to the fishing pole by the angler and controlling the hooked fish using a minimal amount of line.

The applicant has devised a fishing pole for underwater use that provides unique features and function for the underwater environment. While the invention is particularly shown and described with reference to preferred embodiments thereof, it will be understood by those skilled in the art that various changes in form and details may be made therein without departing from the spirit and scope of the invention.

SUMMARY OF THE INVENTION

The invention is directed to a fishing pole and line assembly for underwater use, including a linear, tubular fishing rod member having first and second open ends. A linear, tubular handle member has an open first end and a closed second end and is axially aligned with the rod member. The handle member's open first end slidably fits over the second end of the fishing rod member. The handle member includes a one-way valve member adapted for passing fluid, only into the tubular handle member. A fishing line is secured at a first end interior the tubular handle member, with the fishing line passing interior both the handle member, the fishing rod member and extending exterior through the rod member's open second end. The fishing line has a second end adapted for attachment to a fishing bait.

In a further embodiment of the invention, the fishing pole and line assembly for underwater use includes a fishing rod member with at least two telescoping sections and a handle member with two telescoping sections. The first open end of the rod member includes a fluted surface to prevent binding and wear to fishing line passing there through. The handle member's telescoping sections include a mechanism to lock the sections in a selected degree of extension.

In yet a further embodiment of the invention, the fishing pole and line assembly for underwater use includes a reel housing member attached to the handle member, the reel housing member including a simple spool member for storing excess fishing line.

DESCRIPTION OF THE EMBODIMENTS

Nomenclature

Figure 1:
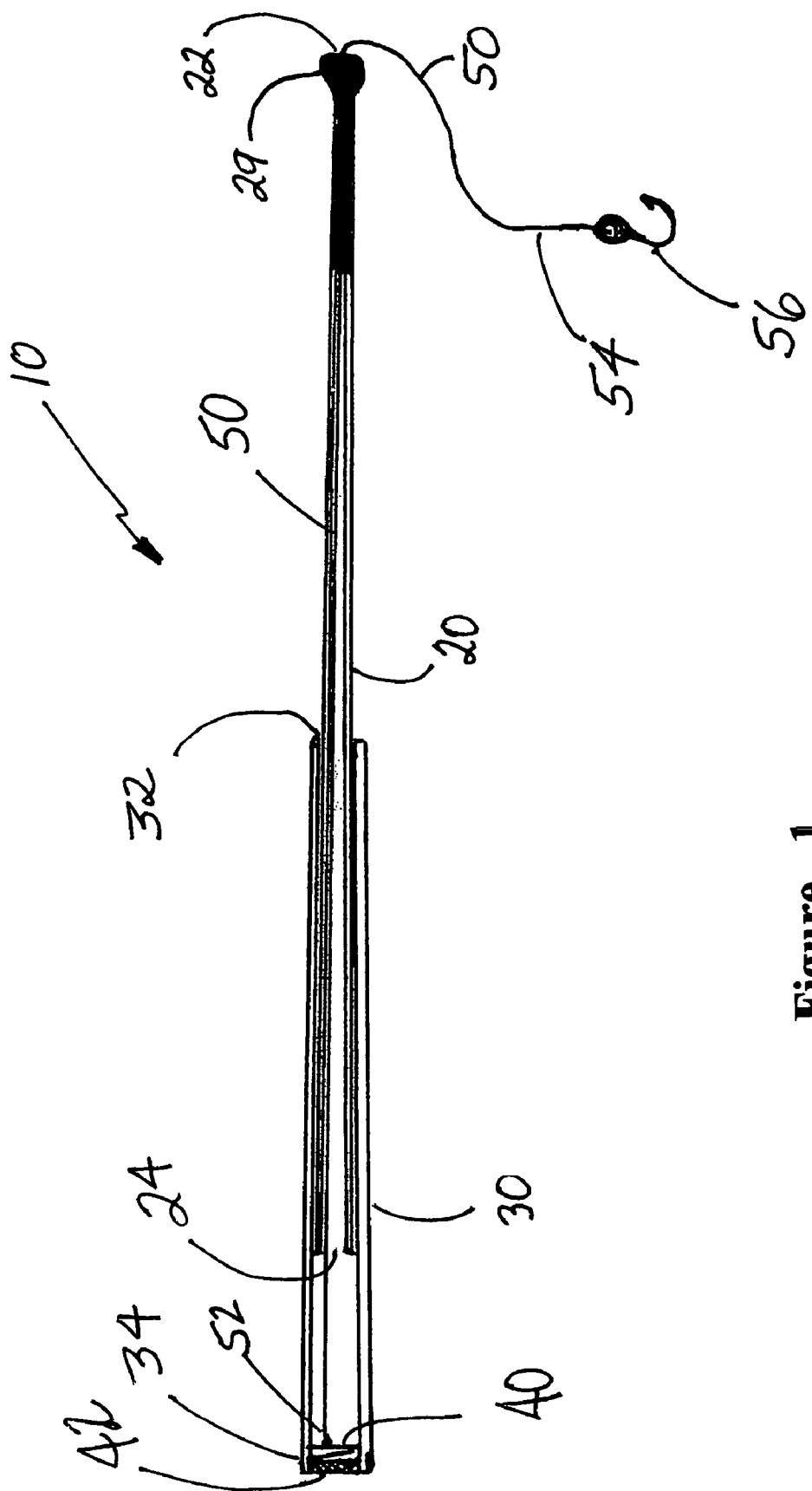
FIG. 1 is a partial sectional view of one embodiment of the fishing pole and line assembly for underwater fishing of the present invention.

10 Fishing Pole and Line Assembly
20 Tubular Fishing Rod Member
22 First Open End of Rod Member
24 Second Open End of Rod Member
26 Telescoping Section of Rod Member
28 Telescoping Section of Rod Member
29 Fluted First End of Rod Member
30 Tubular Handle Member
32 Open First End of Handle Member
33 Open Second End of Handle Member
34 Closed Second End of Handle Member
35 Plug Member of Second End of Handle Member
36 Outer Telescoping Section of Handle Member
38 Inner Telescoping Section of Handle Member
39 Reducer Cuff Member
40 One-Way Valve Member
42 Filter Screen Member
50 Fishing Line
52 First End of Fishing Line
54 Second End of Fishing Line
56 Fish Hook
60 Locking Clamp Member
62 Lever of Clamp Member
70 Reel Member
72 Reel Housing
74 Reel Spool Member
76 Cylindrical Aperture in Reel Housing
77 Thumb Screw for Reel Spool
78 Nut for Thumb Screw
80 Line Channel in Reel Housing
85 Water Channel in Reel Housing
88 Retainer Ring for Filter Screen and Valve Members
90 Crank Member of Reel Spool
92 Threaded Crank Shaft
94 End Nut for Crank Shaft
96 Clutch Washers

CONSTRUCTION

The invention is a fishing pole and line assembly for underwater use. One embodiment of the pole and line assembly includes a linear, tubular fishing rod member having, first and second open ends. A linear, tubular handle member has an open first end and a closed second end and is axially aligned with the rod member. The handle member's open first end slidably fits over the second end of the fishing rod member. The handle member includes a one-way valve member adapted for passing fluid only into the tubular handle member. A fishing line is secured at a first end interior the tubular handle member, with the fishing line passing through the interior of both the handle member and the fishing rod member and extending exterior through the rod member's open first end. The fishing line has a second end adapted for attachment to a fishing bait.

Another embodiment of the pole and line assembly includes a linear, tubular fishing rod member including at least two telescoping sections. The tubular fishing rod member has first and second open ends. A linear, tubular handle member includes at least two telescoping sections with first and second open ends. The handle member's open first end slidably fits over the second end of the fishing rod member. A reel member is attached to the handle member's open second end. The reel member includes a reel housing with a reel spool rotatably mounted therein. The reel housing includes a cylindrical aperture with the handle member's open second end mounted therein. The reel housing also includes a line channel in communication with the cylindrical aperture containing the handle member's open second end and with the reel spool. A fishing line is secured at a first end to the reel spool and passes through the line channel of the reel housing. Then the line passes within both the handle member and the rod member and extends through the open first end of the rod member. The fishing line has a second end adapted for attachment to a fishing bait. A water inlet channel in the reel housing intersects the line channel therein. The water inlet channel includes a one-way valve member allowing water to flow only into the line channel from the water channel.

Referring now to FIG. 1, one embodiment of the fishing pole and line assembly 10 for underwater use is illustrated. The fishing pole and line assembly 10 includes a linear, tubular fishing rod member 20, having a first open end 22 and second open end 24. A linear, tubular handle member 30, having an open first end 32 and a closed second end 34, is axially aligned with the rod member 20 in telescoping relationship. The handle member's open first end 32 slidably fits over the second end 24 of the fishing rod member. The handle member 30 includes a one-way valve member 40 adapted for passing fluid only into the tubular handle member 30. Preferably, the valve member 40 includes a filter screen member 42 to prevent debris from entering the interior of the handle member 30 and the rod member 20. A fishing line 50 is secured at a first end 52 to the interior of the tubular handle member 30, with the fishing line 50 passing through the interior of both the handle member 20 and the rod member 20 and extending exterior through the rod member's open second end 24, as shown in FIG. 1. The fishing line 50 has a second end 54 adapted for attachment to a fishing bait. In a preferred embodiment, the tubular fishing rod member's first open end 22 includes a fluted surface 29 there around, preventing binding and wear to the fishing line 50 passing there through. The fluted surface 29 of the fishing rod member's first open end 22 allows the fishing line 50 to enter the interior of the rod member 20 from any direction without interference.

In use, the underwater angler retracts the fishing rod member 20 into the handle member 30 to extend the fishing line 50 from the open first end 22 of the rod member 20. The baited fish hook 56 is presented to a fish. When the fish takes the baited hook 56, the underwater angler sets the hook 56 by moving the handle member 30 axially away from the rod member 20. The underwater angler achieves this effect by grasping the rod member 20 and the handle member 30, one with each hand, and moving these members apart. Such movement of the handle member 30 allows water to enter the hollow handle member 30 through the one-way valve member 40, while simultaneously drawing the fishing line 50 into the rod member 20, thereby hooking the fish. This action also reduces the length of fishing line 50 between the first end 22 of the rod member 20 and the hooked fish, thereby limiting the potential for entanglement of the fishing line 50. Once the fish is caught and removed from the fish hook 56, movement of the handle member 30 axially toward the rod member 20 forces water and fishing line 50 out the first end 22 of the rod member 20, due to the closing of the one-way valve member 40. Thus, the fishing pole and line assembly 10 is ready for making an additional catch.

Figure 2:
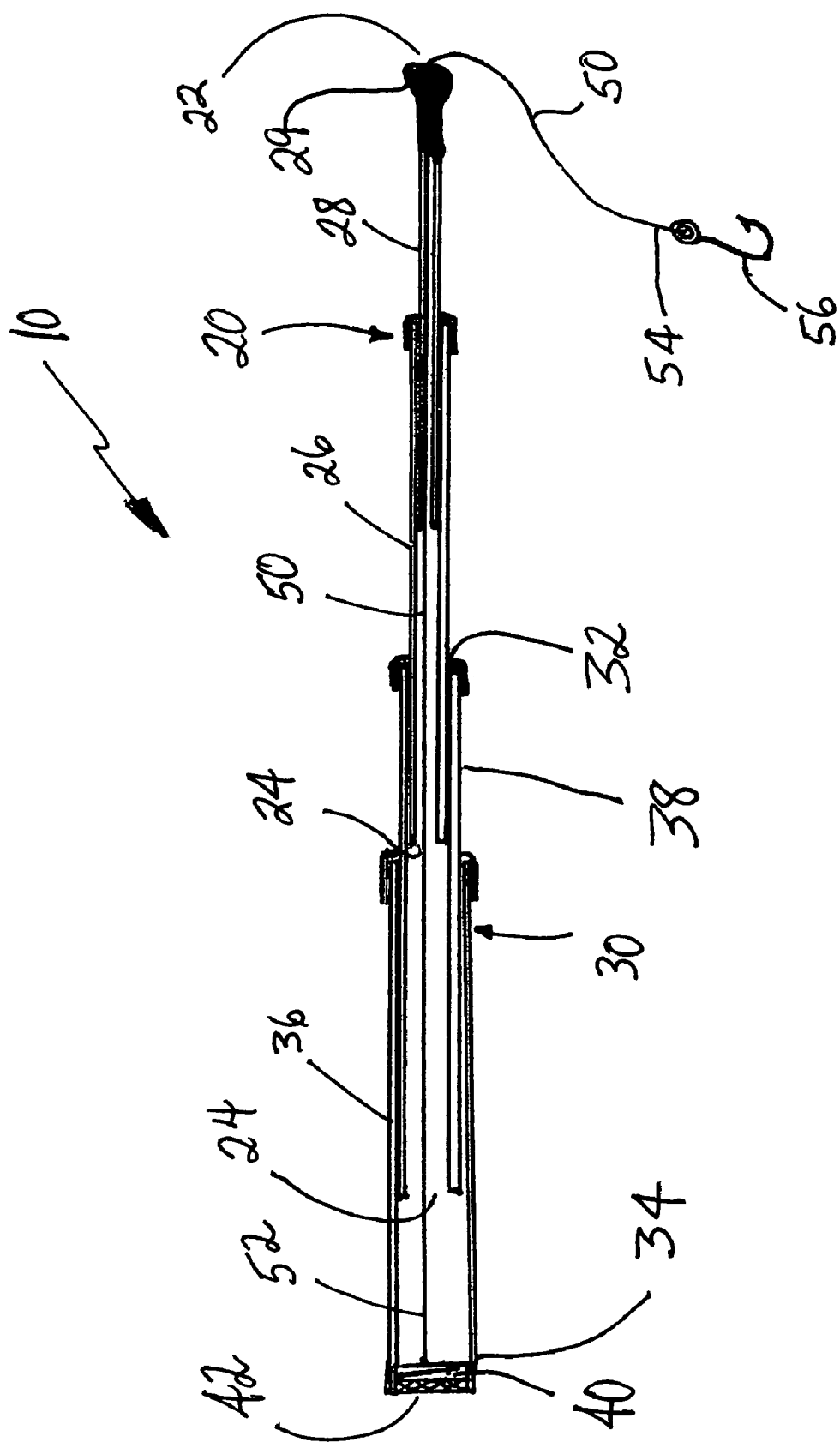
FIG. 2 is a partial sectional view of another embodiment of the fishing pole and line assembly for underwater fishing of the present invention.

In a further embodiment of the invention illustrated in FIG. 2, the linear, tubular fishing rod member 20 includes at least two telescoping rod sections 26, 28 to provide greater length for the rod member 20, while allowing the rod member 20 to collapse to a shorter length for transport. Likewise, the linear, tubular handle member 30 includes two telescoping handle sections 36, 38 axially aligned with the rod member 20 in telescoping relationship, again providing greater length for the handle member 30, while allowing the handle member 30 to collapse to a shorter length for transport. In both instances, the telescoping rod sections 26, 28 of the rod member 20 and the telescoping sections 36, 38 of the handle member 30 are slightly tapered to prevent complete removal of the inner section from the outer section. These features are illustrated in FIG. 2.

Figure 3:
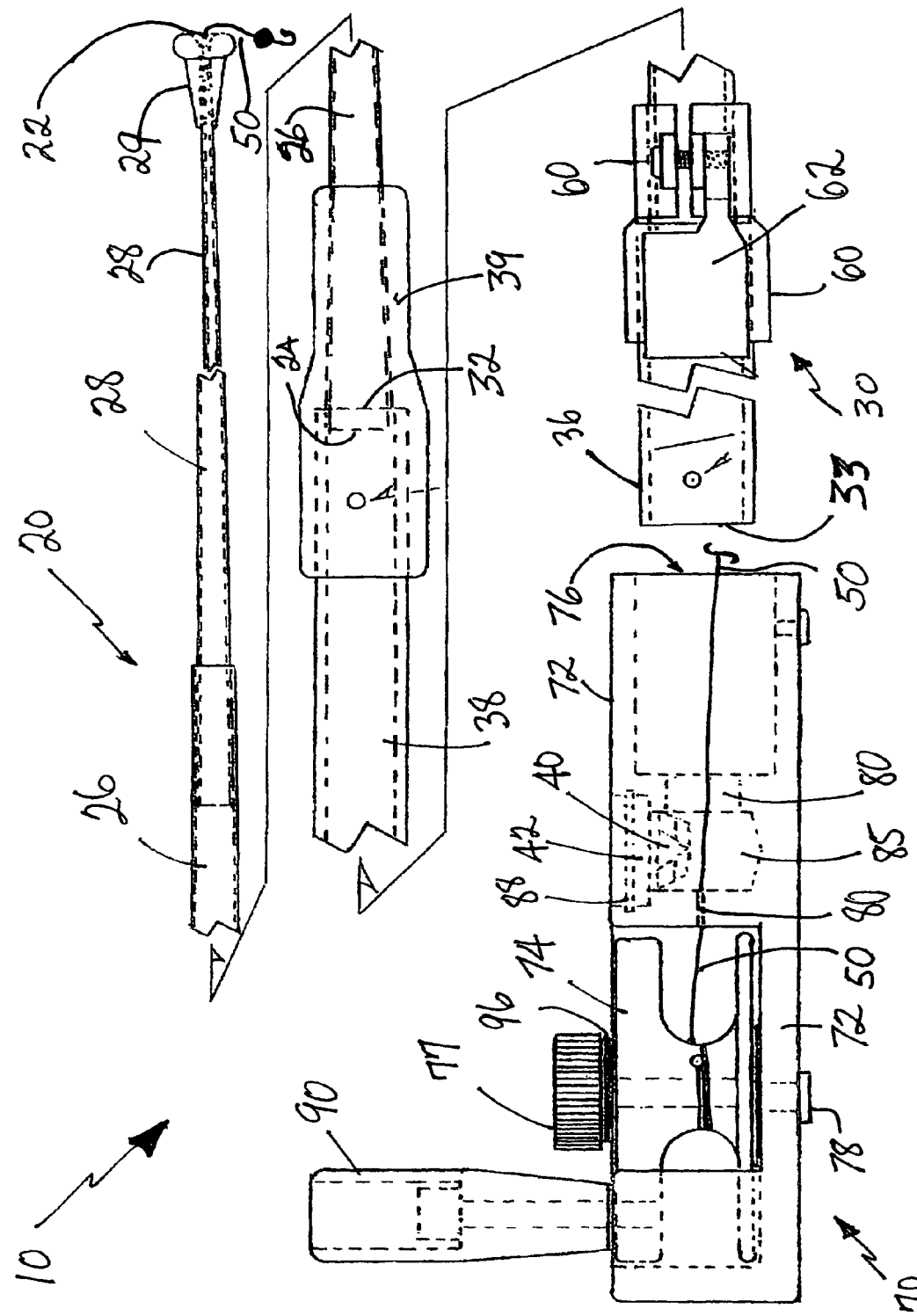
FIG. 3 is a side view of the separate elements of a further embodiment of the fishing pole and line assembly for underwater fishing of the present invention.

Referring now to FIG. 3, another embodiment of the fishing pole and line assembly 10 is illustrated. In the present embodiment, the linear, tubular rod member 20 again includes two telescoping rod sections 26, 28, and the linear, tubular handle member 30 also includes two telescoping handle sections 36, 38. In this embodiment the handle sections 36, 38 can be locked together at any desired degree of extension. The handle member 30 includes an elongated, hollow outer section 36 and an elongated, hollow inner section 38, received in the outer section 36 for axial telescoping movement. The outer section 36 is preferably formed of aluminum tubing, or the like, having an exemplary diameter of one inch. A locking clamp member 60 is secured to the open end of the outer section 36 and encircles the inner section 38. The clamp member 60 includes a lever 62 that decreases the diameter of the portion of the clamp member 60 encircling the inner section 38. Drawing the lever 62 against the handle member's outer section 36 locks the clamp member 60 around the inner section 38. An example of such a locking clamp member 60 is disclosed by Tomm in U.S. Pat. No. 6,908,249. The locking clamp member 60 locks the telescoped position of the handle sections 36, 38 at any selected degree of extension or retraction.

The handle's inner section 38 is also formed of aluminum tubing, or the like, but is of a diameter smaller than the diameter of the outer section 36. For example, where a one-inch diameter tubing is used to form the outer section 36, a ⅞ inch diameter tubing is used for the inner section 38. The open first end 32 of the inner section 38 of the handle member 30 also contains a reducer cuff member 39 that slidably holds the telescoping rod section 26 and provides additional stability for the connection between the rod member 20 and the handle member 30.

Referring again to FIG. 3, the fishing pole and line assembly 10 also includes a reel member 70 attached to the open second end 33 of the handle member 30. The reel member 70 includes a reel housing 72 with a reel spool 74 rotatably mounted on a thumb screw 77 therein. The axis of rotation of the reel spool 74 coincides with the thumb screw 77. A crank member 90 is attached to the reel spool 74 for rotating the reel spool 74 to rewind fishing line 50 around the reel spool 74. The reel housing 72 includes a cylindrical aperture 76 opposite the reel spool 74, with the handle member's open second end 33 mounted therein. The reel housing 72 also includes a line channel 80 in communication with the cylindrical aperture 76 containing the handle member's open second end 33 and in communication with the reel spool 74. The line channel 80 provides a route for the fishing line 50 from the reel spool 74, through the reel housing 72 and into the second open end 33 of the handle member 30. The fishing line 50 extends through the interior of the handle sections 36, 38 and the rod sections 26, 28 and through the open first end 22 of the rod member 20, as described above.

In addition, there is a water inlet channel 85 from one surface of the reel housing 72 that intersects the line channel 80 therein. The water inlet channel 85 includes a filter screen member 42 and a one-way valve member 40, both held in place by a retainer ring 88, allowing water to flow only into the line channel 80 from the water channel 85. The one-way valve member 40 allows water to enter the interior of the handle member 30 and pole member 20 when the telescoping sections of each are extended and forces water out the open first end 22 of the rod member 20 when the telescoping sections of either the rod member 20 or handle member 30 are collapsed. The filter screen member 42 prevents entry of debris into the interior of the handle member 30 and pole member 20, which can interfere with the telescoping action of either member. The fishing line 50 occupies the majority of the cross section of both the line channel 80 and the open, fluted, first end 29 of the rod member 20, thus limiting entry of debris via either opening.

Figure 4:
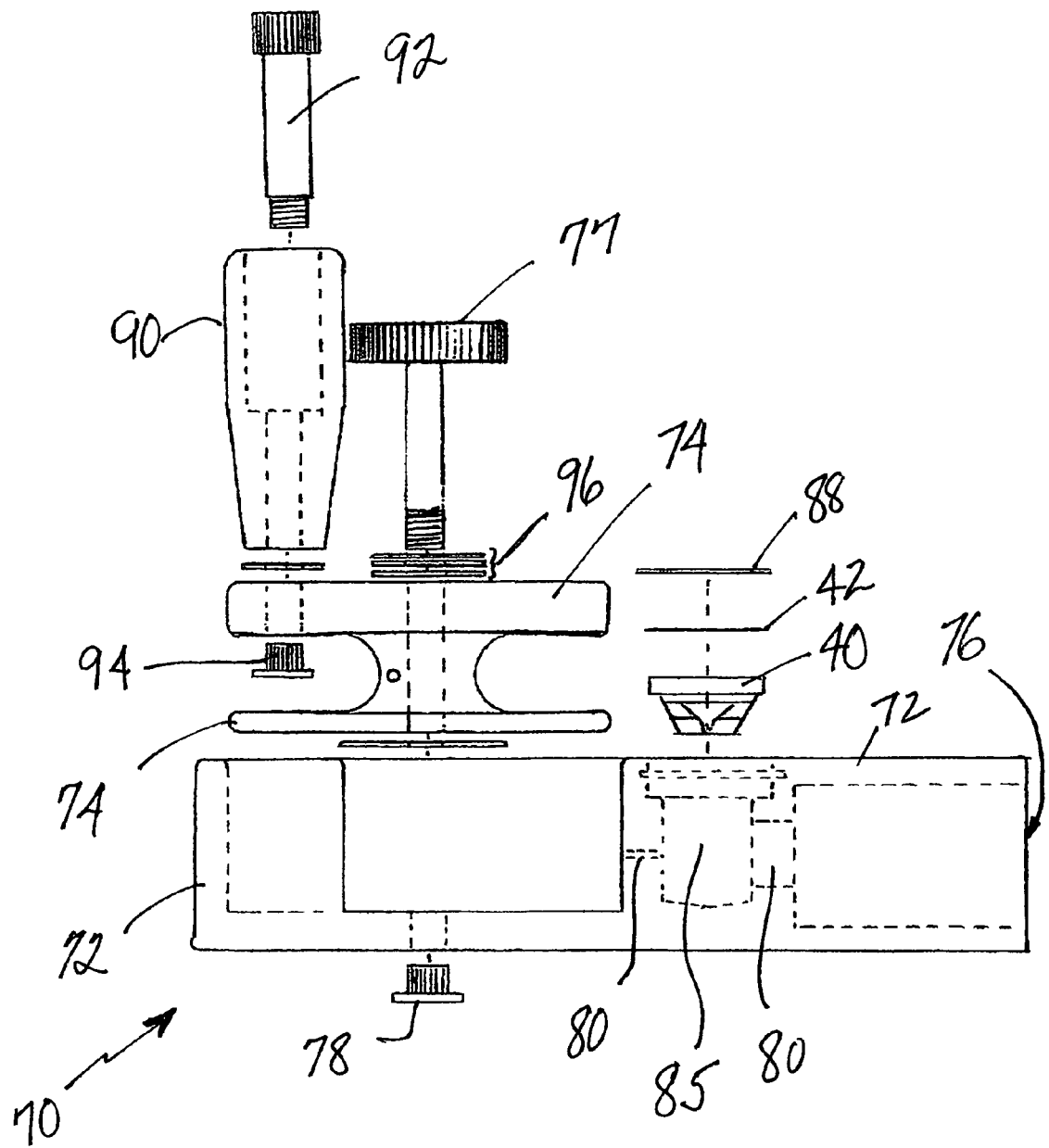
FIG. 4 is an exploded view of the reel housing member of FIG. 3 of the fishing pole and line assembly for underwater fishing of the present invention.
Figure 5:
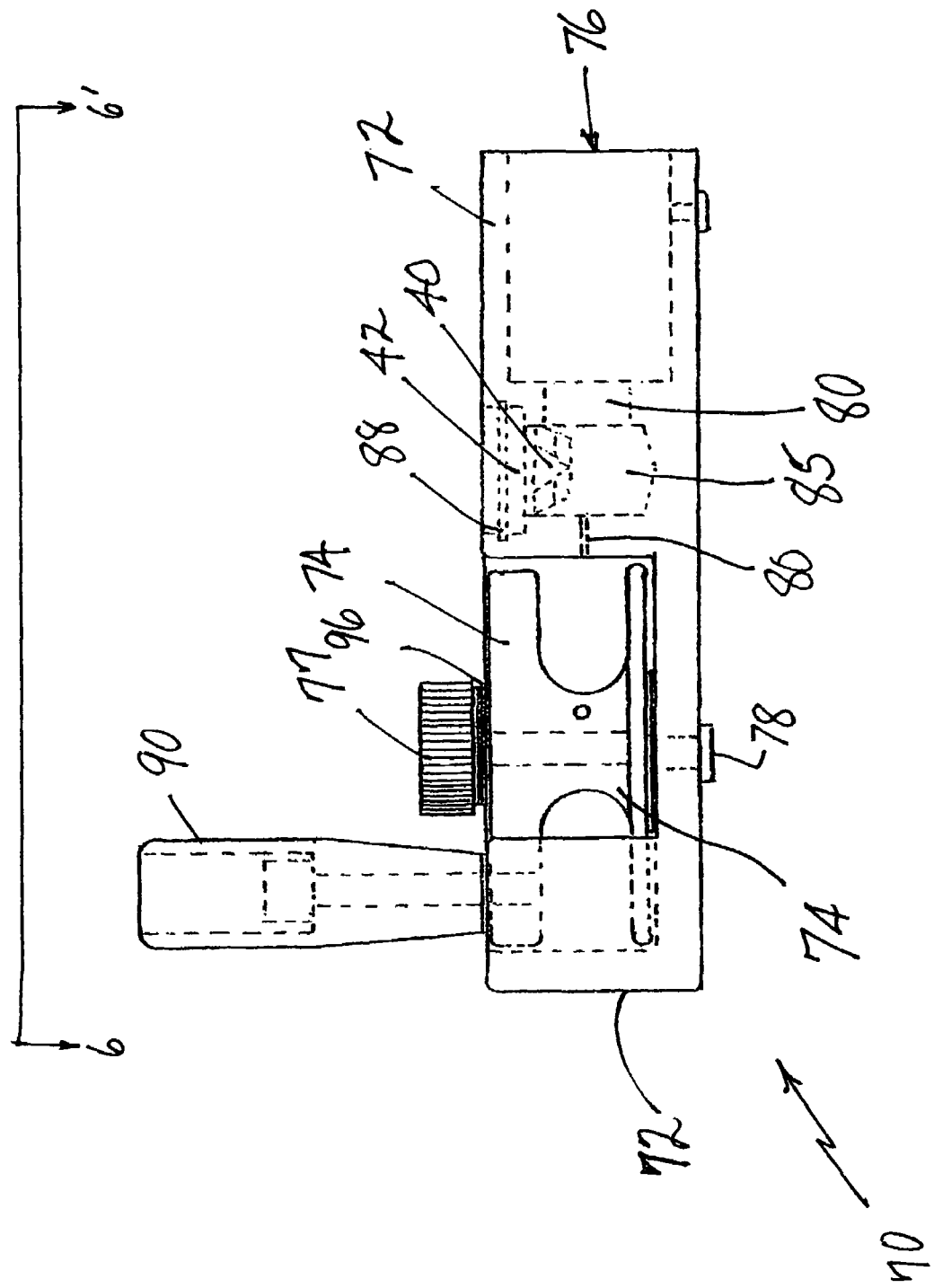
FIG. 5 is a side view of the reel housing member of the fishing pole and line assembly for underwater fishing of the present invention.
Figure 6:
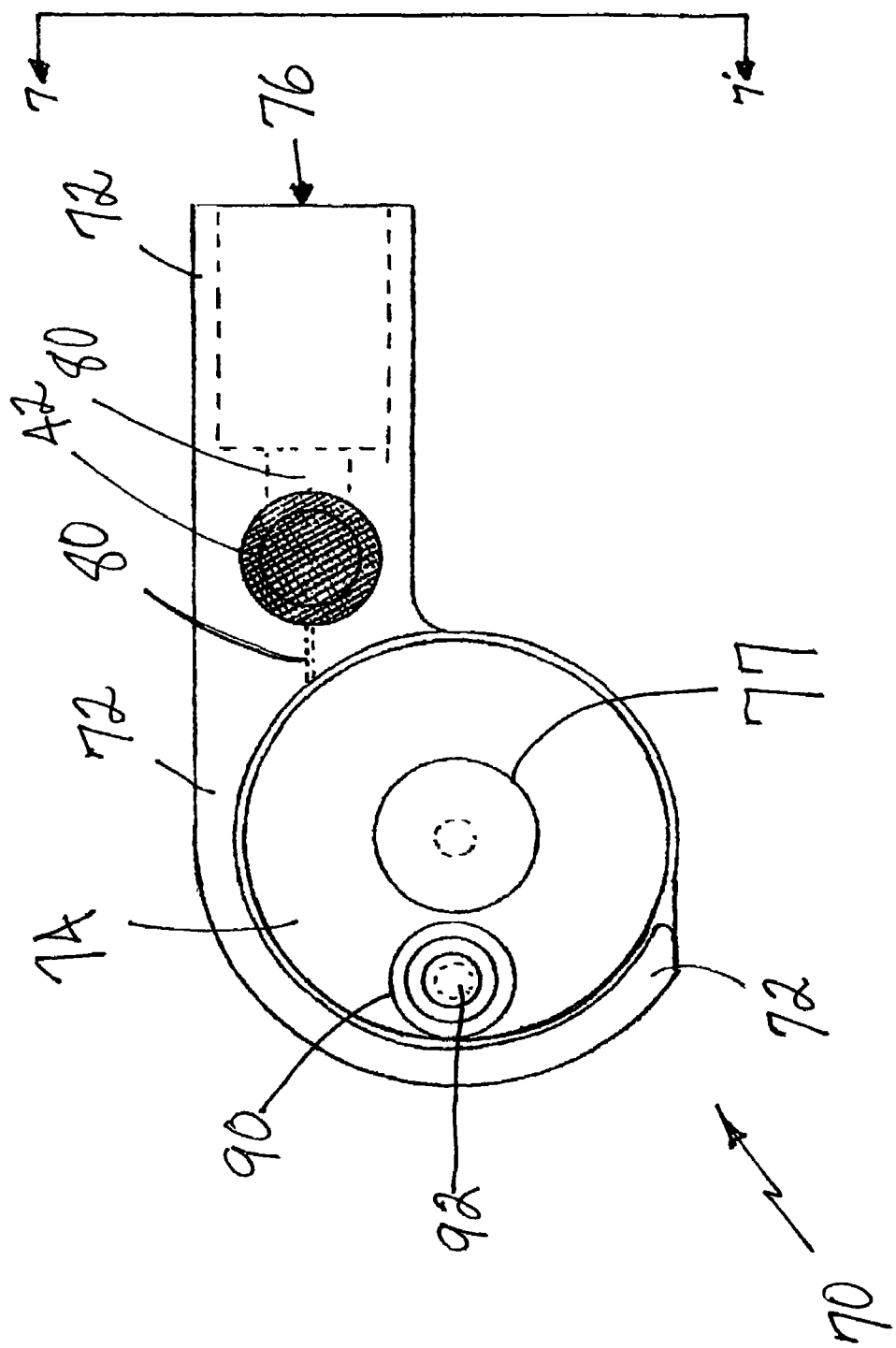
FIG. 6 is a top view from line 6-6' of FIG. 5 of the reel housing member of the fishing pole and line assembly for underwater fishing of the present invention.
Figure 7:
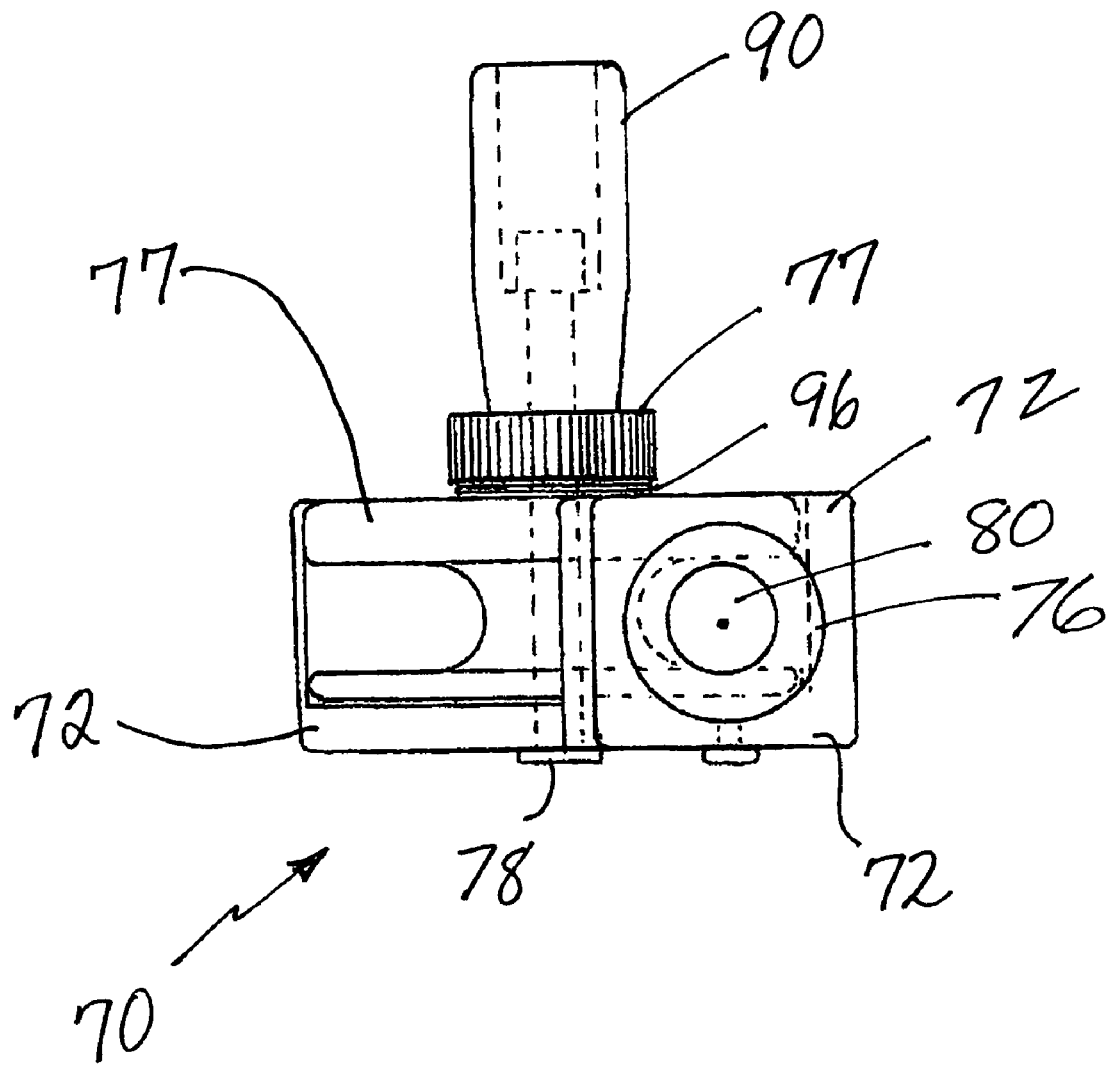
FIG. 7 is an end view from line 7-7' of FIG. 6 of the reel housing member of the fishing pole and line assembly for underwater fishing of the present invention.

Referring now to FIGS. 4-7, a first embodiment of the reel member 70 is shown. FIG. 4 provides an exploded view of the various components of the reel member 70. The crank member 90 is fastened to the reel spool 74 by a threaded crank shaft 92 with an end nut 94. A stack of clutch washers 96 around the thumb screw 77 and adjacent the reel spool 74 provides a variable degree of freedom of rotation for the reel spool 74. The thumb screw 77 of the first embodiment of the reel member 70 is offset from the line channel 80. This is best seen in FIGS. 6 and 7, which are top and end views of the first embodiment of the reel member 70, respectively.

Figure 8:
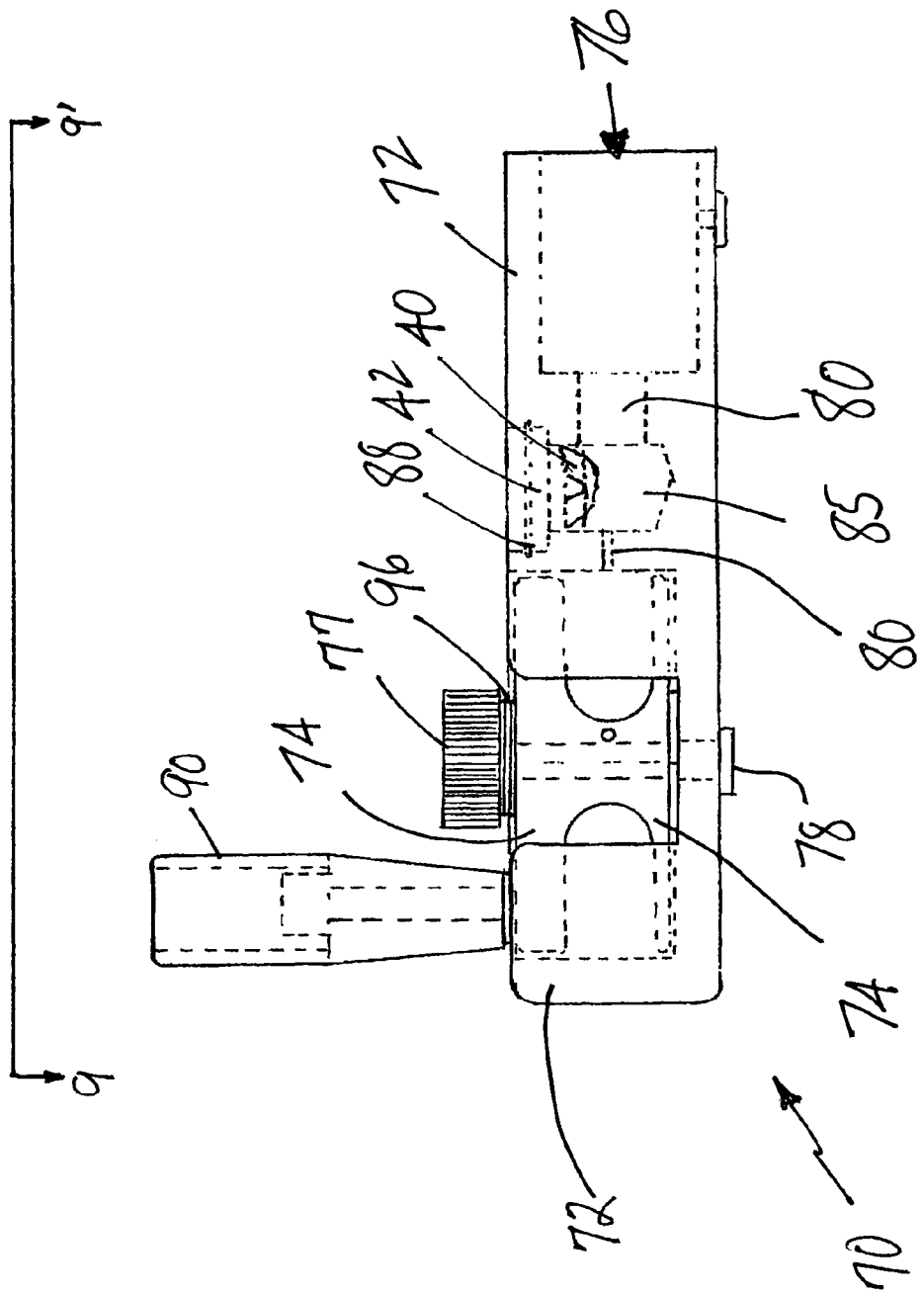
FIG. 8 is a side view of an alternative embodiment of the reel housing member of the fishing pole and line assembly for underwater fishing of the present invention.
Figure 9:
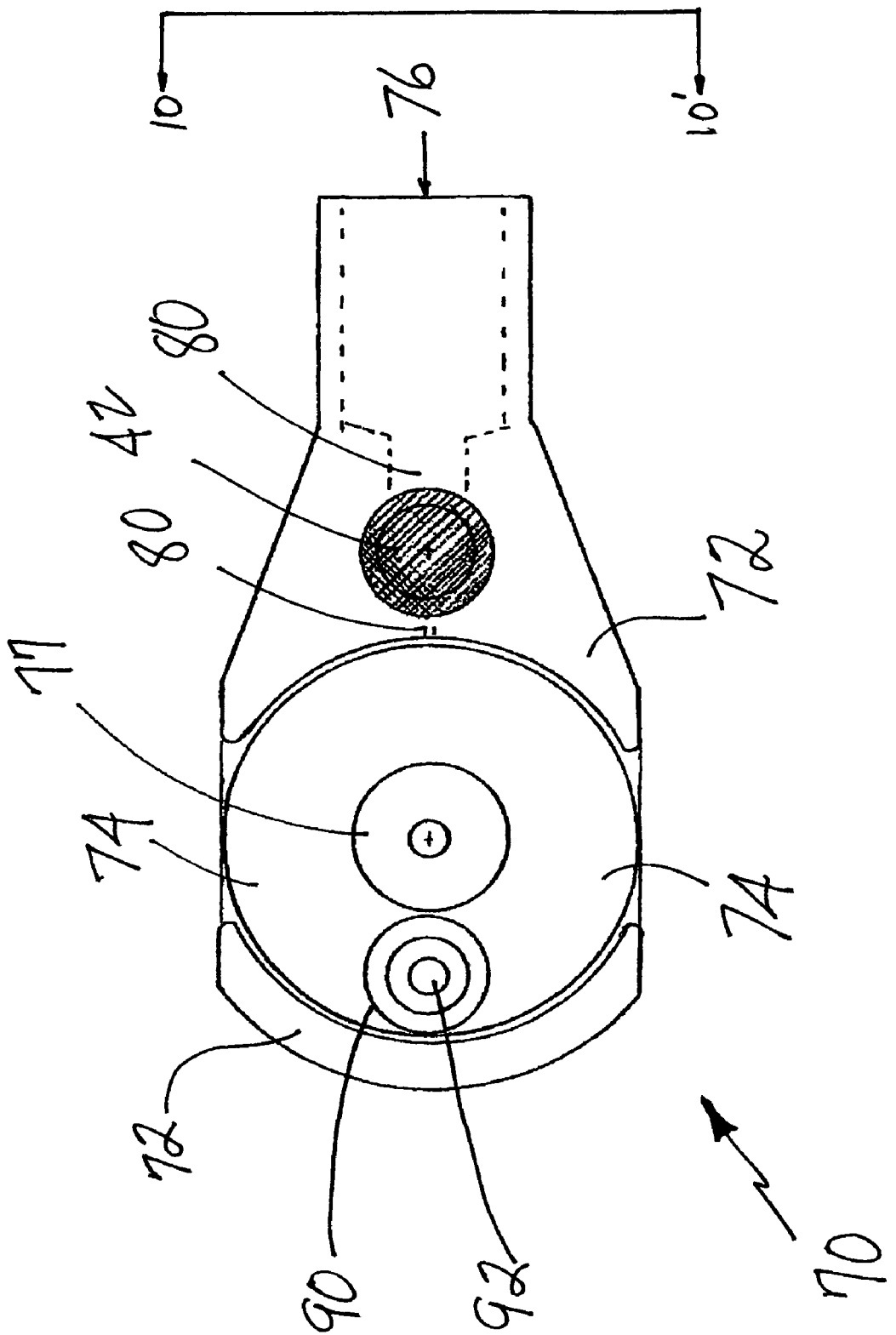
FIG. 9 is a top view from line 9-9' of FIG. 8 of the reel housing member of the fishing pole and line assembly for underwater fishing of the present invention.
Figure 10:
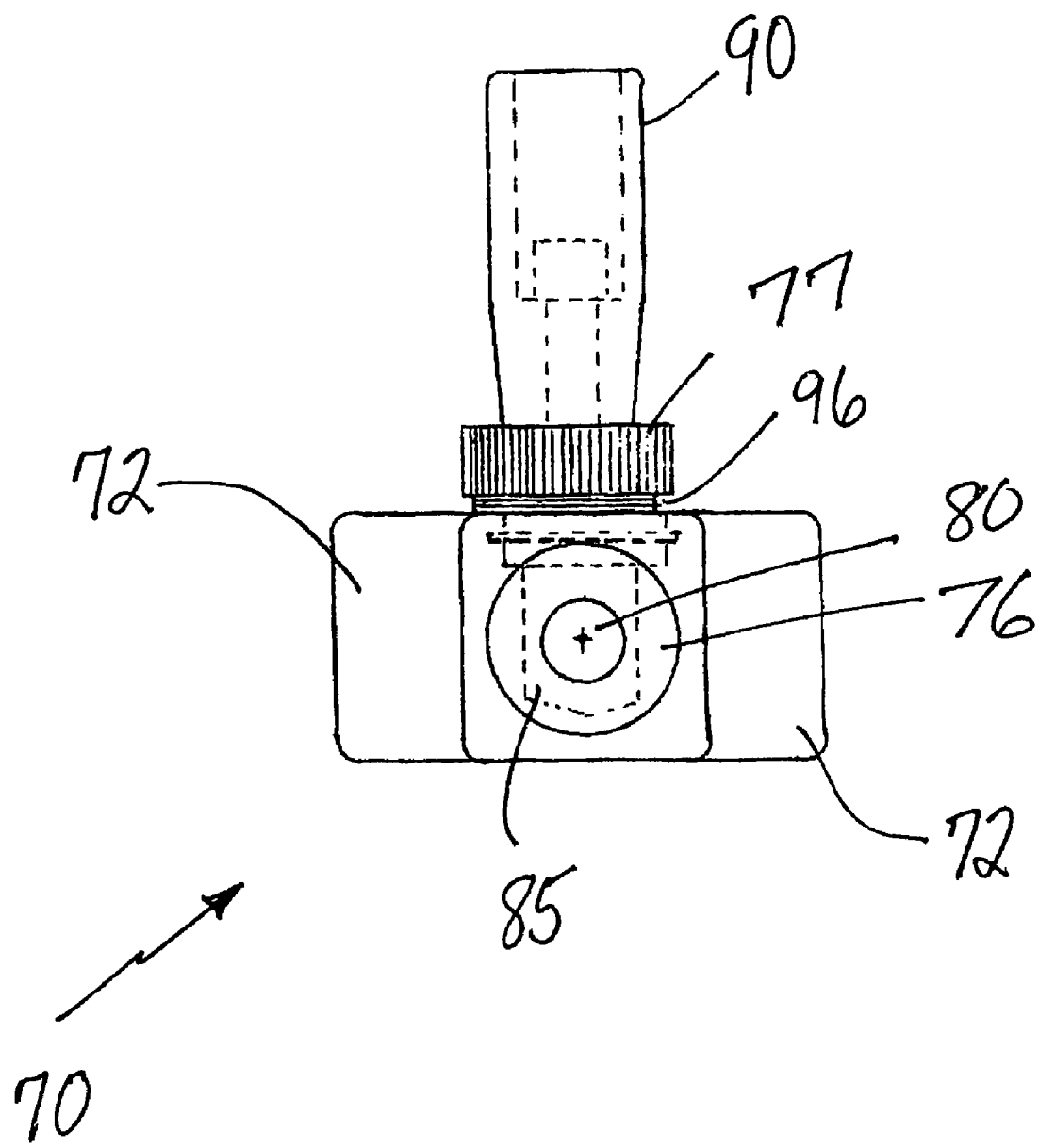
FIG. 10 is an end view from line 10-10' of FIG. 9 of the reel housing member of the fishing pole and line assembly for underwater fishing of the present invention.

FIGS. 8-10 illustrates a second embodiment of the reel member 70. The thumb screw 77 of the second embodiment of the reel member 70 is aligned with the line channel 80. This is best seen in FIGS. 9 and 10, which are top and end views of the second embodiment of the reel member 70, respectively.

The use of the embodiment of the fishing pole and line assembly 10, shown in FIGS. 3-10, is as follows. The rod member 20 and handle member 30 of the fishing pole and line assembly 10 are collapsed and locked down. The fishing line 50, which extends from the reel spool 77 through the interior of both the handle member 30 and pole member 20 and out the open first end 22 of the rod member 20, is taken up on the reel spool 74, and the thumb screw 77 is tightened to prevent the reel spool 74 from rotating. This is the storage and transport state for the pole and line assembly 10.

To prepare for underwater fishing, the fisherman loosens the thumb screw 77 of the reel member 70, freeing the reel spool 77 to allow facile removal of fishing line 50 therefrom. The fisherman then extends the two rod sections 26, 28 and pulls them tightly together. Next, the fisherman extends the rod member 20 from the handle member 30, so the rod member 20 is secured within the reducer cuff member 39. The fisherman then releases the locking clamp member 60 of the handle member 30 and extends the inner section 38 fully from the outer section 36. The second end 54 of the fishing line 50 should be at the open first end 22 of the pole member 20. The fisherman then tightens the thumb screw 77 of the reel spool 74 to an appropriate drag setting so that fishing line 50 can be pulled from the reel spool 70 without breaking the line 50. He then attaches a lure or baited hook 56 to the second end of the fishing line 50. It is preferred that a "quick snap" fastener is used for attaching a lure or hook 56 to the line 50 so either can be easily detached under water by the fisherman.

The fisherman then enters the water with the pole and line assembly 10. After allowing the rod member 20 and handle member 30 to fill with water through the one-way valve member 40, the fisherman retracts the handle member's inner section 38 into the outer section 36. The fishing line 50 now extends from the open first end 22 of the pole member 20 the same distance that the handle member's inner section 38 is retracted into the handle member's outer section 36. The pole and line assembly 10 is now ready for underwater use.

The fisherman presents the bait to a fish. If the fish takes the bait, the fisherman quickly extends the handle member's inner section 38 from the outer section 36, thereby setting the hook in the fish. The one-way valve member 40 allows water to readily enter the outer section 36 of the handle member 30 during the hook setting process. The extension of the handle sections 36, 38 draws the second end 54 of the fishing line 50 and hooked fish very close to the first end 22 of the pole member 20, thereby preventing the fish from wrapping the fishing line 50 around the pole and line assembly 10 or the fisherman. The fisherman then unhooks the fish.

To continue fishing, the fisherman again retracts the handle member's inner section 38 into the outer section 36. The retraction movement forces the water within the handle member 30 out the open first end 22 of the rod member 20, due to the one-way valve member 40 that allows water only to enter the handle member 30.

When the fisherman is done fishing, the sections of the rod member 20 and handle member 30 are contracted, and the locking clamp member 60 is closed to hold all sections within one another. The fisherman then winds up the fishing line 50 on the reel member 70 by rotating the reel spool member 74 using the attached crank member 90.

While the invention has been particularly shown and described with reference to preferred embodiments thereof, it will be understood by those skilled in the art that various changes in form and details may be made therein without departing from the spirit and scope of the invention.

I claim:

1. A fishing pole and line assembly for underwater use comprising:
   a linear, tubular fishing rod member having first and second open ends;
   a linear, tubular handle member having an open first end and a closed second end, the handle member axially aligned with the rod member, the handle member's open first end slidably fitting over the second open end of the fishing rod member, the handle member including a one-way valve member adapted for passing fluid only into the tubular handle member;
   the one-way valve including a filter screen adapted to prevent debris from entering the interior of the handle member and pole member;
   a reducer cuff member enclosing both the handle member's first end and the second open end of the fishing rod member slidably fitting within the handle member's first end; and
   a fishing line secured at a first end interior the tubular handle member, the fishing line passing interior both the handle member and the fishing rod member and extending exterior trough the rod member's open first end, the fishing line having a second end adapted for attachment to a fishing bait.

2. The fishing pole and line assembly for underwater use of claim 1, wherein the tubular fishing rod member includes at least two telescoping sections.

3. The fishing pole and line assembly for underwater use of claim 1, wherein the tubular handle member includes at least two telescoping sections.

4. The fishing pole and line assembly for underwater use of claim 3, wherein the telescoping sections of the tubular handle member include a locking assembly there between.

5. The fishing pole and line assembly for underwater use of claim 1, wherein the tubular fishing rod member's first open end includes a fluted surface there around, preventing binding and wear to the fishing line passing there through.

6. The fishing pole and line assembly for underwater use of claim 1, wherein the one-way valve member is positioned in the closed second end of the handle member.

7. A fishing pole and line assembly for underwater use comprising:
   a linear, tubular fishing rod member including at least two telescoping sections, the tubular fishing rod member having first and second open ends;
   a linear, tubular handle member including at least two telescoping sections, the tubular handle member having first and second open ends, the handle member's open first end slidably fitting over the second open end of the fishing rod member;
   a reel member attached to the handle member's open second end, the reel member including a reel housing with a reel spool rotatably mounted therein, the reel housing including a cylindrical aperture with the handle member's open second end mounted therein, the reel housing including a line channel in communication with the cylindrical aperture containing the handle member's open second end and with the reel spool;
   a fishing line secured at a first end to the reel spool and passing through the line channel of the reel housing and passing interior the handle member and rod member and extending exterior through the open first end of the rod member, the fishing line having a second end adapted for attachment to a fishing bait; and
   a water inlet channel in the reel housing intersecting the line channel therein, the water inlet channel including a one-way valve member allowing water to flow only into the line channel from the water inlet channel.

8. The fishing pole and line assembly for underwater use of claim 7, wherein the tubular fishing rod member's second open end includes a fluted surface there around preventing binding and wear to the fishing line passing there through.

9. The fishing pole and line assembly for underwater use of claim 7, wherein the telescoping sections of the tubular handle member include a locking assembly there between.

10. The fishing pole and line assembly for underwater use of claim 7, wherein the one-way valve includes a filter screen adapted to prevent debris from entering the line channel and hollow interior of the handle member and pole member.

11. The fishing pole and line assembly for underwater use of claim 7, further including a crank member mounted to the reel spool member for rotating the spool member to wind or unwind fishing line therefrom.

12. The fishing pole and line assembly for underwater use of claim 7, further including a cuff member enclosing the connected first end of the handle member and the second end of the rod member.

13. The fishing pole and line assembly for underwater use of claim 7, wherein the reel spool includes an axis of rotation offset from the line channel of the reel housing.

14. The fishing pole and line assembly for underwater use of claim 7, wherein the reel spool includes an axis of rotation aligned with the line channel of the reel housing.

15. A fishing pole and line assembly for underwater use comprising:
   a linear, tubular fishing rod member including at least two telescoping sections, the tubular fishing rod member having first and second open ends;
   a linear, tubular handle member including at least two telescoping sections, the tubular handle member having first and second open end, the handle member's open first end slidably fitting over the second open end of the fishing rod member, the tubular fishing rod member's second open end including a fluted surface there around;

a reel member attached to the handle member's open, second end, the reel member including a reel housing with a reel spool rotatably mounted therein, the reel housing including a cylindrical aperture with the handle member's open second end mounted therein, the reel housing including a line channel in communication with the cylindrical aperture containing the handle member's open second end and with the reel spool;

a fishing line secured at a first end to the reel spool and passing through the line channel of the reel housing and passing interior the handle member and rod member and extending exterior through the open first end of the rod member, the fishing line having a second end adapted for attachment to a fishing bait; and a water inlet channel in the reel housing intersecting the line channel therein, the water inlet channel including a filter member and a one-way valve member allowing water to flow only into the line channel from the water inlet channel.

16. The fishing pole and line assembly for underwater use of claim 15, further including a crank member mounted to the reel spool member for rotating the spool member to wind or unwind fishing line therefrom.

17. The fishing pole and line assembly for underwater use of claim 15, further including a cuff member enclosing the connected first end of the handle member and the second end of the rod member.

\* \* \* \* \*